Figure 1:
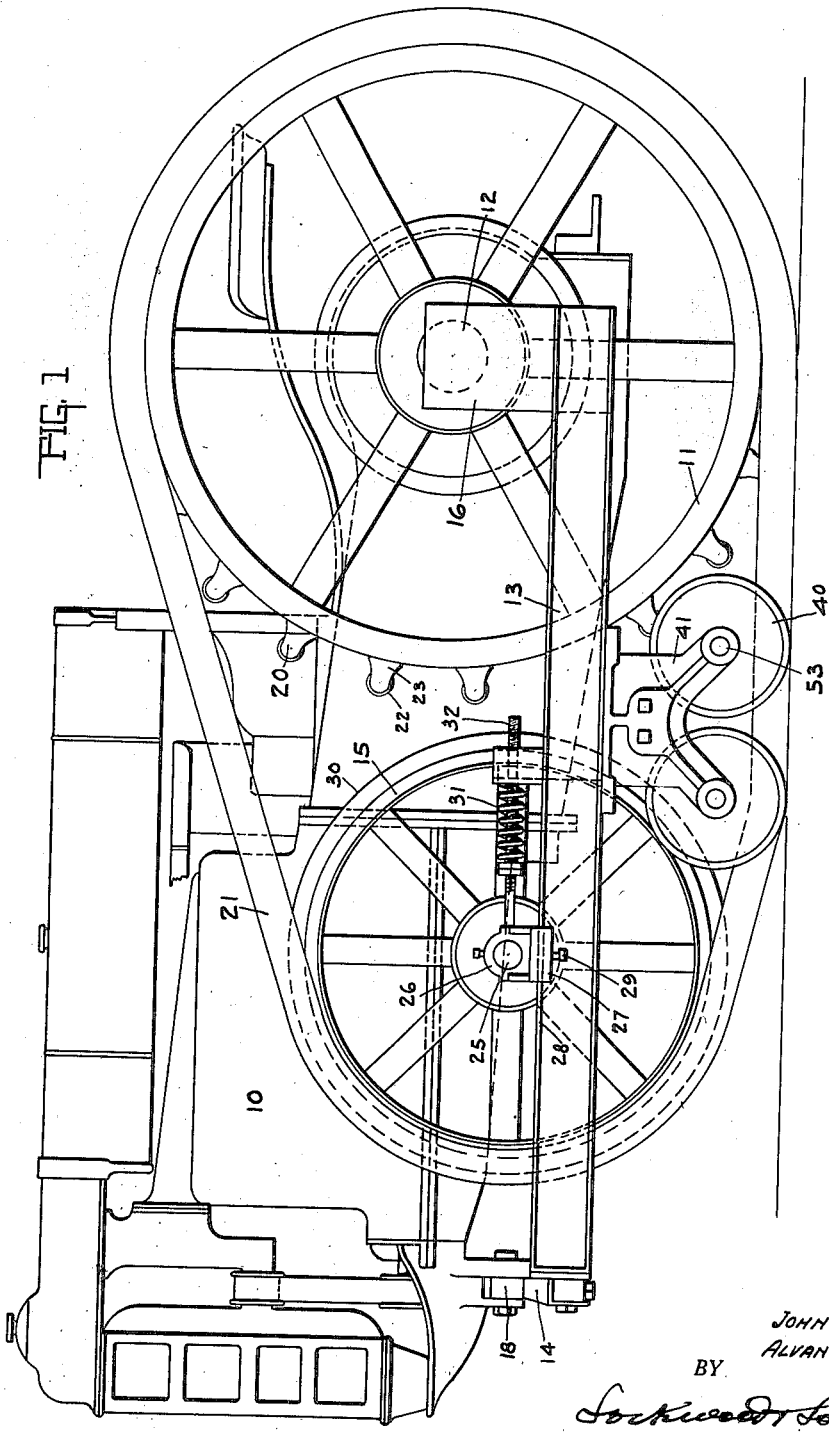

J. W. AND A. R. LAMBERT.
CHAIN TREAD TRACTOR.
APPLICATION FILED DEC. 14, 1918.

1,398,382.

Patented Nov. 29, 1921.
3 SHEETS—SHEET 1.

INVENTOR.
JOHN W. LAMBERT
ALVAN RAY LAMBERT
BY
Lockwood & Lockwood
ATTORNEY.

J. W. AND A. R. LAMBERT.
CHAIN TREAD TRACTOR.
APPLICATION FILED DEC. 14, 1918.

1,398,382.

Patented Nov. 29, 1921.
3 SHEETS—SHEET 2.

INVENTOR.
JOHN W. LAMBERT
ALVAN RAY LAMBERT
BY
Lockwood & Lockwood.
ATTORNEY.

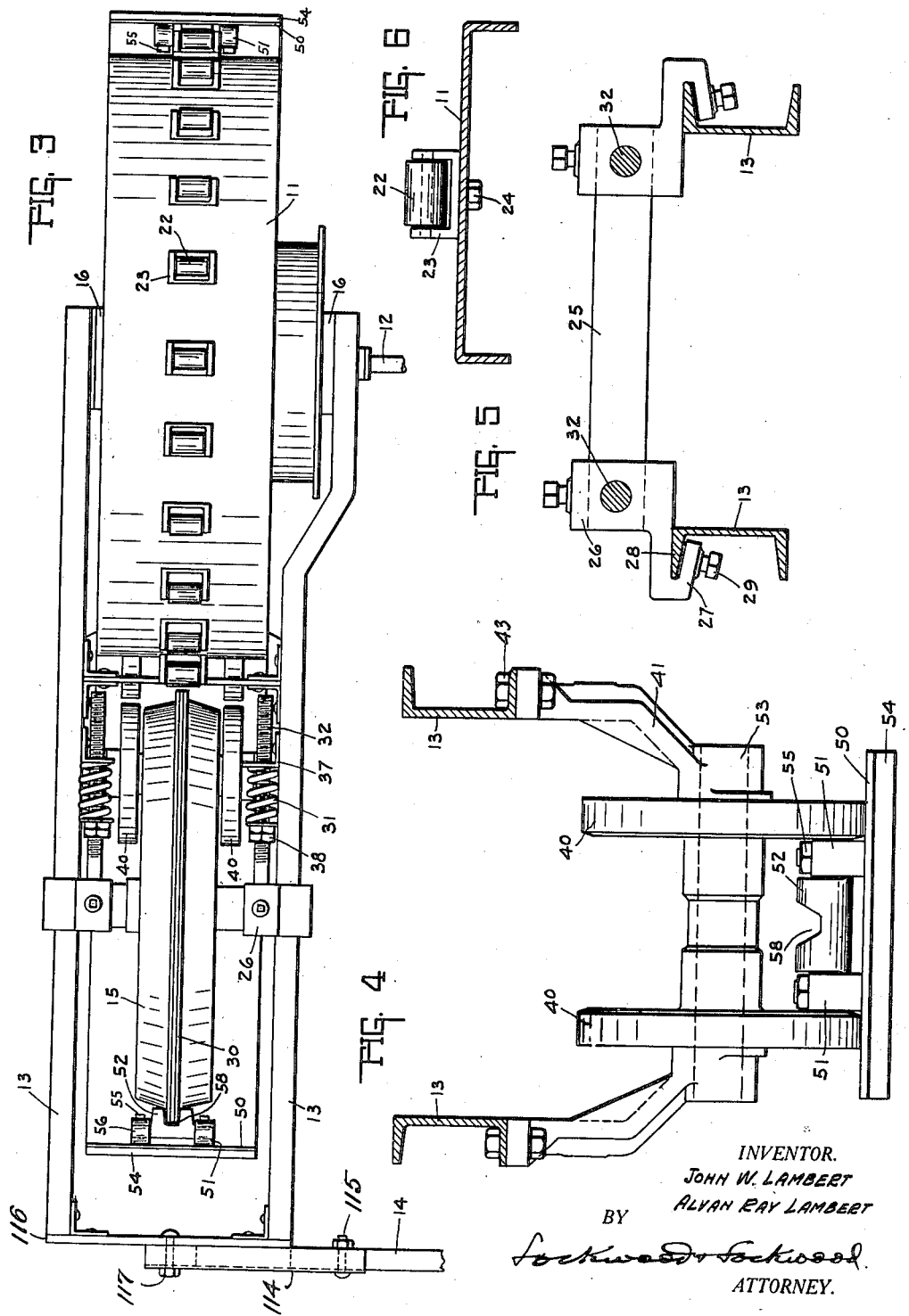

UNITED STATES PATENT OFFICE.

JOHN W. LAMBERT AND ALVIN RAY LAMBERT, OF ANDERSON, INDIANA.

CHAIN-TREAD TRACTOR.

1,398,382. Specification of Letters Patent. Patented Nov. 29, 1921.

Application filed December 14, 1918. Serial No. 266,760

*To all whom it may concern:*

Be it known that we, JOHN W. LAMBERT and ALVIN RAY LAMBERT, citizens of the United States, and residents of Anderson, county of Madison, and State of Indiana, have invented a certain new and useful Chain-Tread Tractor; and we do hereby declare that the following is a full, clear, and exact description thereof, reference being had to the accompanying drawings, in which like letters refer to like parts.

The chief object of this invention is to convert Fordson or wheel-tread tractors quickly and cheaply into chain-tread tractors.

This enables such chain-tread tractor to be made immediately and much more cheaply than if otherwise made, the expense being about half of what it would cost to make such chain-tread tractor entirely.

This invention also enables one who has a Fordson or like tractor to cheaply and quickly change it into a chain-tread tractor, whenever he may desire, and if he wishes he can change it back to its original form. Hence one can have apparatus from which he can make either form of tractor when desired. It is often desirable to use a chain-tread tractor, on account of the condition of the terrain or the special work involved. This is true for war purposes as well as in agriculture.

The invention consists in the method of converting an ordinary wheel tractor into a chain tread tractor and in the construction resulting from the conversion of the tractor from one form to the other.

In this method of conversion the tractor must be shortened and the engine, frame, wheels and other parts of the Fordson tractor utilized, but chain teeth are secured on the rear or drive wheels for receiving and driving the chain tread and the front wheels are placed in a position nearer the rear wheels and mounted in an added frame and so as to be slidable longitudinally and are spring pressed forwardly so as to hold taut the chain tread which runs over the front wheel. The front wheel has a central guiding rib and therefore the chain tread is formed so as to operate on such a wheel. The front wheels cease to be traction wheels supporting the load under normal conditions of operation, but normally the forward part of the tractor is supported by supplemental trolley or small wheels located between the front and rear wheels but as near the front wheels as possible and so that they travel on the chain tread.

The full nature of the invention will be understood from the accompanying drawings and the following description and claims.

Figure 2:
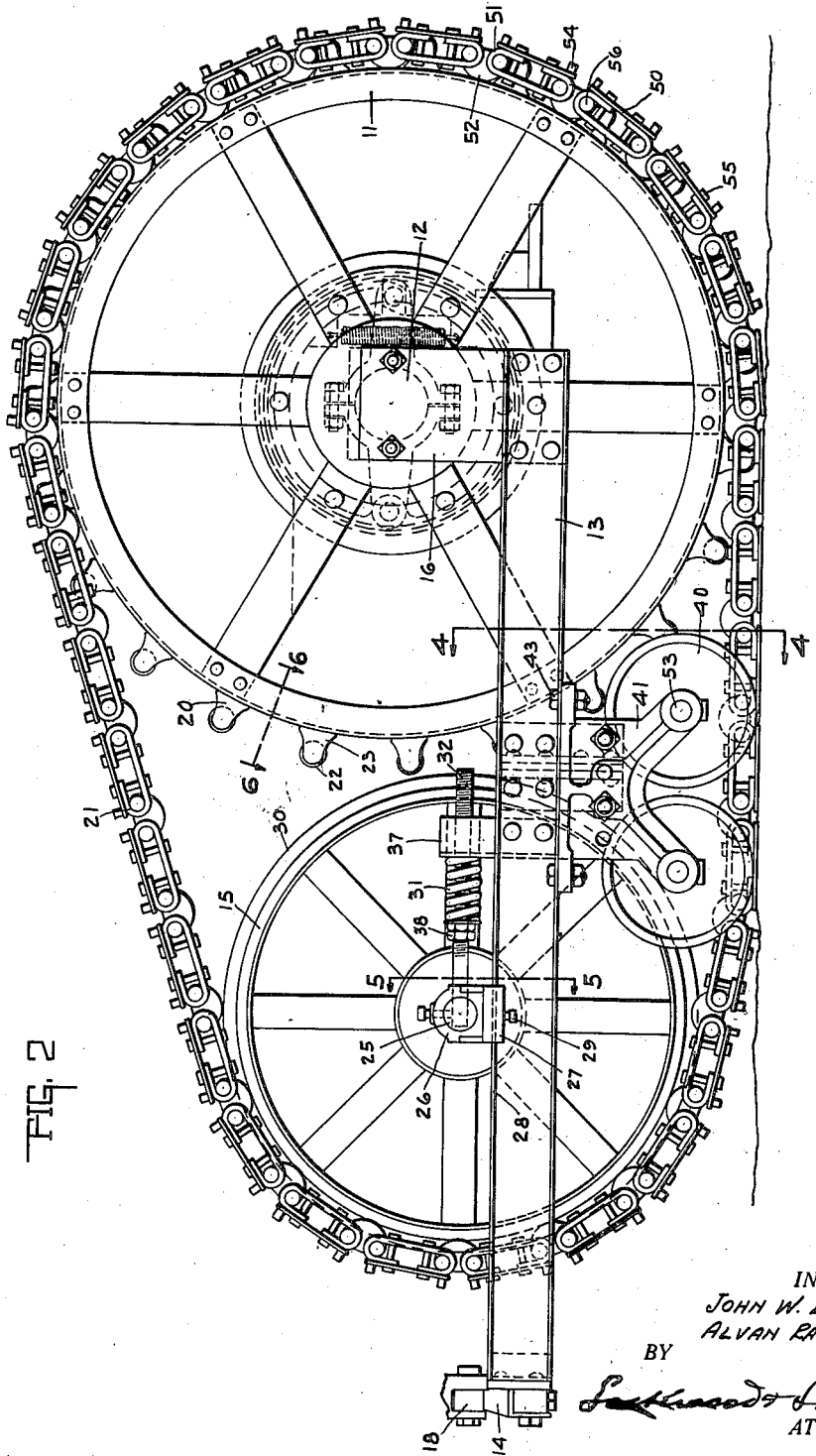

In the drawings Figure 1 is a side elevation of the converted chain tread tractor, the chain tread being shown only in outline. Fig. 2 is a side elevation of the frame and wheels at one side of the tractor, showing the chain tread and teeth in full. Fig. 3 is a plan view of the wheels and frame at the right hand side of the chain tread tractor, the upper portion of the chain tread being omitted for the sake of clearness, and parts being broken away. Fig. 4 is a vertical section on the line 4—4 of Fig. 2, the front and rear wheels being omitted and the frame bars being in sections, the small trolley wheels, frame and chain tread section being in rear elevation. Fig. 5 is a section on the line 5—5 of Fig. 2. Fig. 6 is a section on the line 6—6 of Fig. 2.

The tractor in its original form has the engine 10 for propelling the same, the rear wheels 11 on the rear axle 12, the front axle 14 and the front wheels 15. The engine is mounted in the usual way, being supported at two points on the rear axle 12 and centrally and pivotally at 18 on the front axle 14.

The invention is not limited to a particular form of tractor to be converted, that herein shown being what is known as a Fordson tractor, and shown herein for the purpose of illustrating the invention. It may be added that the chain tread tractor herein shown is intended to be steered by brake mechanisms acting independently on the two rear wheels 11, said brake mechanisms being indicated by dotted line in Fig. 2, but constituting no part of this invention as they are familiar to those skilled in the art.

To convert an ordinary four wheel tractor cheaply and quickly into a chain-tread tractor the rear or drive wheels 11 must be equipped with teeth 20 for the purpose of engaging and driving the chain tread 21. To do this any traction cleats that may be on said rear wheels will have to be removed and the teeth 20 substituted therefor. In the tractor here shown these teeth are formed as illustrated in Fig. 6, the transversely extending roller 22 being mounted in a bearing bracket 23 which is secured centrally on the outer periphery of the rear wheels 11 by bolts 24.

Frame bars 13 are also added at each side of the rear and front wheels and mounted in connection with the rear axle 12. The knuckle and spindle (not shown) on each end of the front axle 14 are removed, and a bar extension 114 is secured to the axle 14 by bolts 115, in place of the spindle and bar 114 is fulcrumed by pivot 117 to the bar 116 secured to the front ends of frame bars 13 so as to be vertically oscillatory thereon.

The front wheels 15 are each mounted on a stub axle 25 secured in boxes 26 slidably brought nearer the rear wheels and mounted on the angle frame bars 13 at each side of the front wheel 15. This is illustrated in Figs. 2 and 5. Each bearing box 26 has an extension 27 extending around and under the top flange 28 of the frame bar 13 and a set screw 29 is provided in said extension 27 for clamping the bars 26 on the frame bars, if desired.

The front wheels 15 each have, in all the ordinary wheel tractors, a central peripheral rib 30 for guiding the wheel and preventing lateral skidding. The chain tread is formed so as to operate on such wheel and the rib 30 prevents lateral displacement of the chain tread. Each front wheel is forced forwardly so as to hold the chain tread taut, by springs 31 on screw rods 32 connected at one end to the bearing boxes 26. The other end of each rod 32 is slidably mounted in a bracket 37 secured to the frame bar 13. The spring 31 lies between said bracket 37 and adjustable nuts 38 on the rod 32. Therefore, when the screws 29 are not tightened up the springs 31 will force the front wheels forward and tighten the chain tread.

Between the front and rear wheels chain-tread trolley wheels 40 are mounted in frames 41 which are secured to the frame bars 13 and as close to the rear surface of the front wheels as possible and so as to ride on the chain tread and support the forward part of the tractor so as to hold the front wheels normally elevated somewhat, as shown.

At each side of the machine there are four trolley wheels 40 arranged in pairs, as shown in Figs. 2 and 4. There is a front pair and a rear pair, as shown in Fig. 4, adapted to travel on the tread plates 50 of the chain tread near the lateral edges thereof and astride the main links 51 and the connecting links 52. Consequently, there is a pair of trolley wheels arranged tandem, as shown in Fig. 2, which travel on the tread plates 50 near each lateral edge thereof. Each forward or rearward pair of trolley wheels is mounted on an axle 53 that is mounted in a lower horizontal portion of the frame 41, as seen in Fig. 4. The inner and outer sides of this frame 41, as seen in Figs. 2 and 4, are secured to the inner and outer frame bars 13 by bolts 43 and each inner and outer side of the frame is bifurcated at its lower end, as seen in Fig. 2, and each rearwardly and forwardly extending arm thereof carries an axle 53. Therefore, the four trolley wheels 40 are mounted in a single rigid frame 41 so that the trolley wheels can rotate, but not otherwise alter their positions. They have smooth treads.

The chain tread may be made in any desired way suitable for the changed condition of the front and rear wheels, but that shown herein is composed of the tread plates 50 with outwardly extending cleats 54 thereon and near each side of the plate there is secured a link 51, as shown in Figs. 2 and 4, by bolts 55. The links 51 are far enough apart to operate astride the teeth 23 on the rear wheel 11 and the links 51 on adjacent tread plates 50 are united by a connecting link 52 which has its inner surface curved longitudinally so as to constitute a tooth on the chain tread for operating with the teeth on the drive wheel 11, as shown in Fig. 2. These connecting links 52 have laterally extending pins 56 on each side which project into the links 51 on the tread plates. Each link 52 has also a longitudinal notch 58 centrally located in its inner surface, as seen in Fig. 4, to enable the chain tread to operate astride the rib 30 on the front wheel, as seen at the left hand end of Fig. 3.

The invention claimed is—

1. The combination with a conventional tractor including a body, driving wheels, an axle centrally pivoted to the body, and another pair of wheels adapted to be mounted on said axle, the latter wheels being removed from the axle, of an endless track attachment comprising a frame journaled on the mounting for the driving wheels, means for pivotally connecting the end of the frame to said axle, means for operatively mounting the wheels removed from said axle in the tractor frame, and an endless track device trained around each of the driving wheels and the corresponding other wheel, substantially as set forth.

2. The combination with a conventional tractor including a body, rear driving wheels, a front axle centrally pivoted to the body, and front wheels, the latter being removed from the axle, of an endless track attachment comprising a frame adapted to be journaled on the mounting for the rear driving wheels, means for pivotally connecting the forward end of the frame to the front axle, means for operatively mounting the front wheels in the tractor frame, and an endless track device trained around the front and rear wheels of the tractor.

3. The combination with a conventional tractor including a body, rear driving wheels, a front axle centrally pivoted to the body, and front wheels, the latter being removed from the axle, of an endless track attachment comprising a frame journaled on the mounting for each of the rear driving wheels so as to provide a separate frame at each side of the machine, means for pivotally connecting the forward end of each of said frames to the corresponding end of the front axle, means for operatively mounting each front wheel in its corresponding frame, and an endless track device trained around each rear wheel of the tractor and the corresponding front wheel.

4. The combination with a conventional tractor including a body, rear driving wheels, a front axle centrally pivoted to the body, and front wheels, the latter being removed from the axle, of an endless track attachment comprising a frame formed of two longitudinal bars journaled on the mounting for each of the rear driving wheels and on both sides of said wheel and connected at their front ends so that there will be one such frame at each side of the machine, means for pivotally connecting the front end of each of said frames to the corresponding end of the front axle, means for operatively mounting each front wheel within and on the side bars of the corresponding frame, and an endless track device trained around each rear driving wheel and its corresponding front wheel.

5. The combination with a conventional tractor including a body, driving wheels, an axle centrally pivoted to the body, and another pair of wheels adapted to be mounted on the front axle, the latter being removed from said axle, of an endless track attachment comprising a frame journaled in the mounting for each of the driving wheels so that there will be one of said frames on each side of the machine, means for pivotally connecting the forward end of each of said frames to the corresponding end of said axle, means for slidably mounting the wheels removed from said axle in said corresponding tractor frames, an endless track device trained around each driving wheel and the corresponding wheel slidably mounted on the frame, and means for yieldingly forcing each slidably mounted wheel away from its corresponding driving wheel.

6. The combination with a conventional tractor, including a body, driving wheels, an axle centrally pivoted to the body, and another pair of wheels each having a central peripheral rib and adapted to be mounted on said axle, the latter wheels being removed from the axle, of an endless track attachment comprising a frame journaled on the mounting for the driving wheels, means for pivotally connecting the end of the frame to said axle, means for operatively mounting the wheels removed from said axle on the tractor frame, and an endless track device trained around each of the driving wheels and the corresponding other wheel, and embracing the peripheral rib thereon.

7. The combination with a conventional tractor including a body, driving wheels, an axle centrally pivoted to the body, and another pair of wheels adapted to be mounted on said axle, the latter wheels being removed from the axle, of an endless track attachment comprising a frame journaled on the mounting for the driving wheels, means for pivotally connecting the end of the frame to said axle, means for operatively mounting the wheels removed from said axle in the tractor frame, an endless track device trained around each of the driving wheels and the corresponding other wheel, and trolley wheels mounted in connection with the frame between the pairs of wheels on each side thereof and in position to drive on the endless track, substantially as set forth.

8. The combination with a conventional tractor including a body, rear driving wheels, a front axle centrally pivoted to the body, and front wheels, the latter being removed from the axle, of an endless track attachment comprising a frame adapted to be journaled on the mounting for the rear driving wheels, means for pivotally connecting the forward end of the frame to the front axle, means for operatively mounting of the front wheels in the tractor frame, an endless track device trained around the front and rear wheels of the tractor, and trolley wheels mounted in connection with the frame between the front and rear wheels in position to travel on the endless track and arranged to support the front portion of the tractor elevated so that the front wheels will carry no load normally.

9. The combination with a conventional tractor, including a body, rear driving wheels, a front axle centrally pivoted to the body, and front wheels, the latter being removed from the axle, of an endless track attachment comprising a frame adapted to be journaled on the mounting for the rear driving wheels, means for pivotally connecting the forward end of the frame to the front axle, means for operatively mounting of the front wheels in the tractor frame, an endless track device trained around the front and rear wheels of the tractor, trolley wheels mounted in connection with the frame between the front and rear wheels in position to travel on the endless track and arranged to support the front portion of the tractor elevated so that the front wheels will carry no load normally, means for mounting said front wheels on said frames so as to be longitudinally slidable, and spring supported screws mounted on said frame in connection with said slidable mounting for longitudinally adjusting them on the frame and holding the front wheels in position for maintaining the endless track taut.

In witness whereof, we have hereunto affixed our signatures.

JOHN W. LAMBERT.
ALVIN RAY LAMBERT.